United States Patent [19]

Karaki

[11] Patent Number: 4,604,555
[45] Date of Patent: Aug. 5, 1986

[54] INTENSITY MODULATION CIRCUIT FOR CATHODE-RAY TUBES

[75] Inventor: Nobuo Karaki, Suwa, Japan

[73] Assignee: Seiko Epson Corporation, Tokyo, Japan

[21] Appl. No.: 640,480

[22] Filed: Aug. 13, 1984

[30] Foreign Application Priority Data

Aug. 12, 1983 [JP] Japan .................... 58-147819

[51] Int. Cl.⁴ .............. H01J 29/52; G09G 1/14
[52] U.S. Cl. .................... 315/383; 340/744
[58] Field of Search ............ 315/383, 384, 385; 340/793, 744, 746, 750; 358/168, 169, 184

[56] References Cited

U.S. PATENT DOCUMENTS

| | | | |
|---|---|---|---|
| 2,913,521 | 11/1959 | Thomas | 358/184 |
| 2,920,135 | 1/1960 | Fyler | 358/184 |
| 3,465,199 | 9/1969 | Simshauser | 315/385 |
| 3,775,637 | 11/1973 | Brady | 315/385 |
| 3,946,275 | 3/1976 | Marino | 315/384 |
| 3,955,120 | 5/1976 | Jurgensen | 315/384 |
| 4,086,579 | 4/1978 | Easter | 315/383 |
| 4,177,409 | 12/1979 | Chamberlain, Jr. | 315/383 |
| 4,251,755 | 2/1981 | Bryden | 315/383 |
| 4,322,662 | 3/1982 | Nakamura et al. | 315/383 |
| 4,427,927 | 1/1984 | Nakamura | 315/383 |

Primary Examiner—Theodore M. Blum
Assistant Examiner—David Cain
Attorney, Agent, or Firm—Blum Kaplan Friedman Silberman & Beran

[57] ABSTRACT

An intensity modulation circuit for a cathode-ray display device. Designating circuitry produces digital signals representative of at least two areas of the display of the cathode-ray tube. Analog signal producing circuitry produces from said digital signal analog video signals having at least two brightness grades, one of said grades being associated with each of said areas of display. Intensity modulation circuitry is coupled to the analog signal producing circuitry for varying the amplification of the analog video signal in at least one but not all of said grades. Output amplification circuitry receives the analog video signals and drives the cathode-ray tube in response thereto.

19 Claims, 20 Drawing Figures

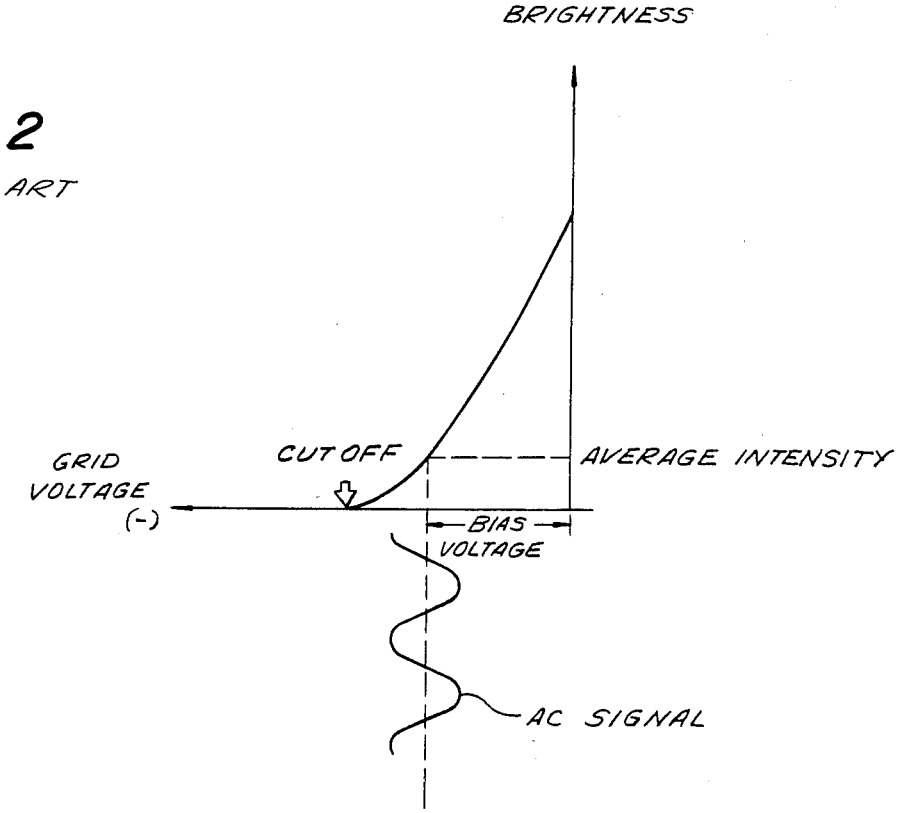

| VIDEO SIGNAL | HALFTONE SIGNAL | HIGHLIGHT SIGNAL | INTENSITY |
|---|---|---|---|
| L | * | L | BRIGHTEST |
| L | * | H | 2ND BRIGHTEST |
| H | L | * | 3RD BRIGHTEST |
| H | H | * | 4TH BRIGHTEST |

H ; HIGH
L ; LOW
* ; NO EFFECT

| SIGNAL 41 | SIGNAL 42 | INTENTSITY MODULATION MODE | | | MULTILAYER MODE | | |
|---|---|---|---|---|---|---|---|
| | | VIDEO SIGNAL | HALFTONE SIGNAL | HIGHLIGHT SIGNAL | VIDEO SIGNAL | HALFTONE SIGNAL | HIGHLIGHT SIGNAL |
| L | L | H | H | H | H | H | H |
| L | H | H | L | H | L | H | H |
| H | L | L | ✳ | H | L | H | H |
| H | H | L | ✳ | L | L | H | H |
| | | MODE SIGNAL H | | | MODE SIGNAL L | | |
*FIG.9*
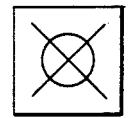
DISPLAYED IMAGE
*FIG.10*

INTENSITY MODULATION CIRCUIT FOR CATHODE-RAY TUBES

BACKGROUND OF THE INVENTION

The invention relates to an intensity modulation circuit for cathode-ray tubes, and in particular to an intensity modulation circuit capable of varying the brightness of the display screen of a cathode-ray tube only in a specified area.

Brightness gradation, as used herein, means a variation in the brightness among various portions of the screen. In monochrome television displays, for example, the screen can have several grades of brighter and darker areas on the screen. These variations, however, have no bearing on the average brightness of the screen. Dark images on the screen also have their own brightness grades as well as bright image.

Intensity modulation, as used herein means varying the average value of brightness only in a specified area on the screen by the use of an external rheostat, for example. Intensity modulation in monochrome television, for example, can be achieved by adjusting the rheostat to make the overall screen darker or brighter.

Reference is made to FIG. 1 wherein a conventional television receiver is depicted. The brightness on a cathode-ray tube is varied by changing a bias voltage between a first grid 152 and a cathode 150, as disclosed in *Television Receiver From Principles to Practical Circuits*, written by Tatsuo Tohmine and Masamichi Takano, and published by Keigaku Shuppan.

Reference is next made to FIG. 2 wherein the effect on intensity (brightness) of the variation in DC bias applied to grid 152 of the cathode-ray tube is depicted. The DC bias applied to grid 152 determines the operating point of the cathode-ray tube and the AC component of the video signal varies the grid potential across the operating point. Since the AC component of the video signal has an average voltage of zero, the average value of the grid potential is equal to the DC bias voltage. An average electrode beam (anode current) and a resulting intensity correspond to the bias voltage. Accordingly, it is the DC bias voltage which is responsible for providing an average brightness or intensity to the overall video image displayed on the television receiver.

Reference is next made to FIG. 3 wherein circuitry used to adjust the bias voltage between a first grid 162 and a cathode 161 is depicted. FIG. 3 depicts a conventional intensity modulation circuit. The positive voltage on cathode 161 is selected by movement of variable resistor 164 utilized for intensity modulation. Adjustment of variable resistor 164 to increase the bias voltage, between grid 162 and cathode 161, reduces the anode current, thereby making the screen darker.

The operating point varies between the cutoff point where the average intensity is zero and a maximum level which depends upon the display medium.

The prior art intensity modulation is achieved by varying the bias voltage between first grid and cathode of a cathode-ray tube. As is clearly seen in FIG. 2, intensity modulation is effected by the displacement of grid voltage along the x axis which causes a uniform variation in brightness over the entire screen. As a result, the brightness varies evenly over the screen, both in brighter and darker areas.

However, there is a need for the ability to vary the brightness of a television screen in only limited areas of the display. In addition, there is a need for an ability to select an area to be highlighted by a variation in intensity.

SUMMARY OF THE INVENTION

An intensity modulation circuit for cathode-ray tubes is provided, wherein a first input-stage amplifier supplied with a digital intensity modulation signal modulates the brightness of one grade in an analog fashion in a desired range. Intensity modulation elements vary the output signal from a second input-stage amplifier. A final-stage amplifier supplied with output signals from the first and second input-stage amplifiers develops a potential difference between a first grid and the cathode of the cathode-ray tube.

Accordingly, it is an object of the invention to provide an improved intensity modulation circuit for cathode-ray tubes.

Another object of the invention is to provide an intensity modulation circuit for a cathode-ray tube which allows intensity modulation of a cathode-ray tube display in selected areas without affecting the intensity outside of the selected areas.

Yet another object of the invention is to provide an intensity modulation circuit for cathode-ray tubes which allows for the superposition of images on a cathode-ray tube display.

Still another object of the invention is to provide an intensity modulation circuit which with a simple circuit arrangement is capable of varying the brightness of a desired area on a television screen without affecting the brightness of other areas on the screen.

A further object of the invention is to provide an intensity modulation circuit for cathode-ray tubes which allows for analog variation of a selected area of a television screen without varying the brightness of the surrounding areas.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 is a diagram showing the relationship between the brightness and the bias voltage in a conventional intensity modulation circuit;

FIG. 9 is a truth table for signals in the circuit of FIG. 8;

FIG. 10 is a diagram showing a video image produced on a screen by the superposition of two images;

DETAILED DESCRIPTION OF THE PREFERRED EMBODIMENTS

Figure 1:
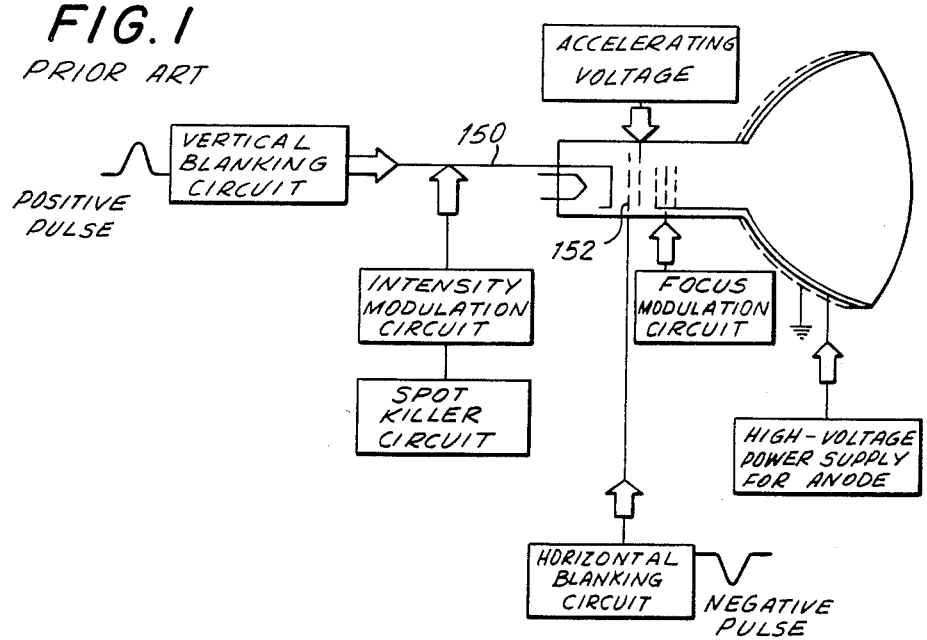
FIG. 1 is a block diagram of a cathode-ray tube display circuit constructed in accordance with the prior art.
Figure 3:
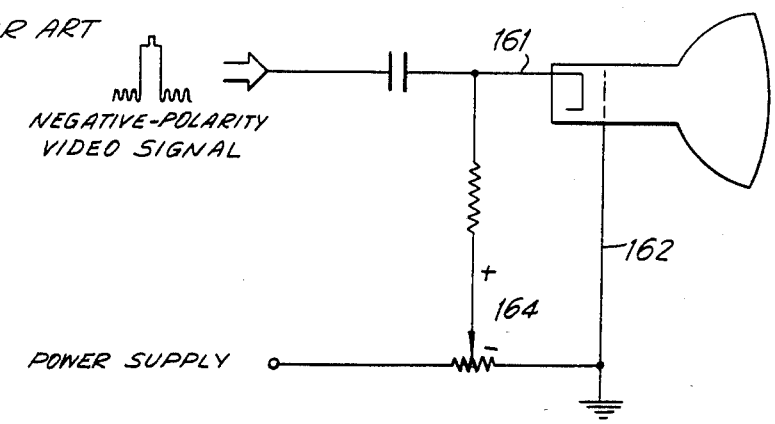
FIG. 3 is a circuit diagram of a conventional intensity modulation circuit in which signals are applied to the cathode of the cathode-ray tube.
Figures 4, 6:
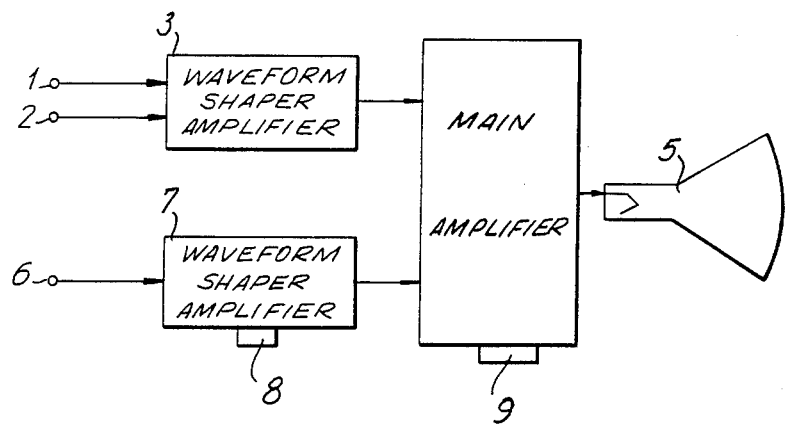
FIG. 4 is a block diagram of an intensity modulation circuit for a cathode-ray tube constructed in accordance with the present invention.
FIG. 6 is a truth table for signals in the circuit of FIG. 5.

Reference is first made to FIG. 4 wherein an intensity modulation circuit constructed in accordance with the invention is shown in block diagram form. A digital video signal 1 and a digital highlight signal 2 are supplied by a host computer (not shown), and converted by an input waveform shaper amplifier 3 into analog signals which are applied through a main amplifier 4 to a cathode ray tube 5. A halftone signal 6 is also supplied by the hose computer and sent through an imput waveform shaper amplifier 7 and main amplifier 4 to cathode-ray tube 5.

An intensity modulation knob 8 for only varying the brightness of a specified area on the screen is associated with input waveform shaper amplifier 7. Halftone signal 6 is in this way varied. A second intensity modulation knob 9, for varying the brightness of the entire screen is associated with main amplifier 4 for varying the amplification of video signal 1, highlight signal 2 and halftone signal 6.

Figure 5:
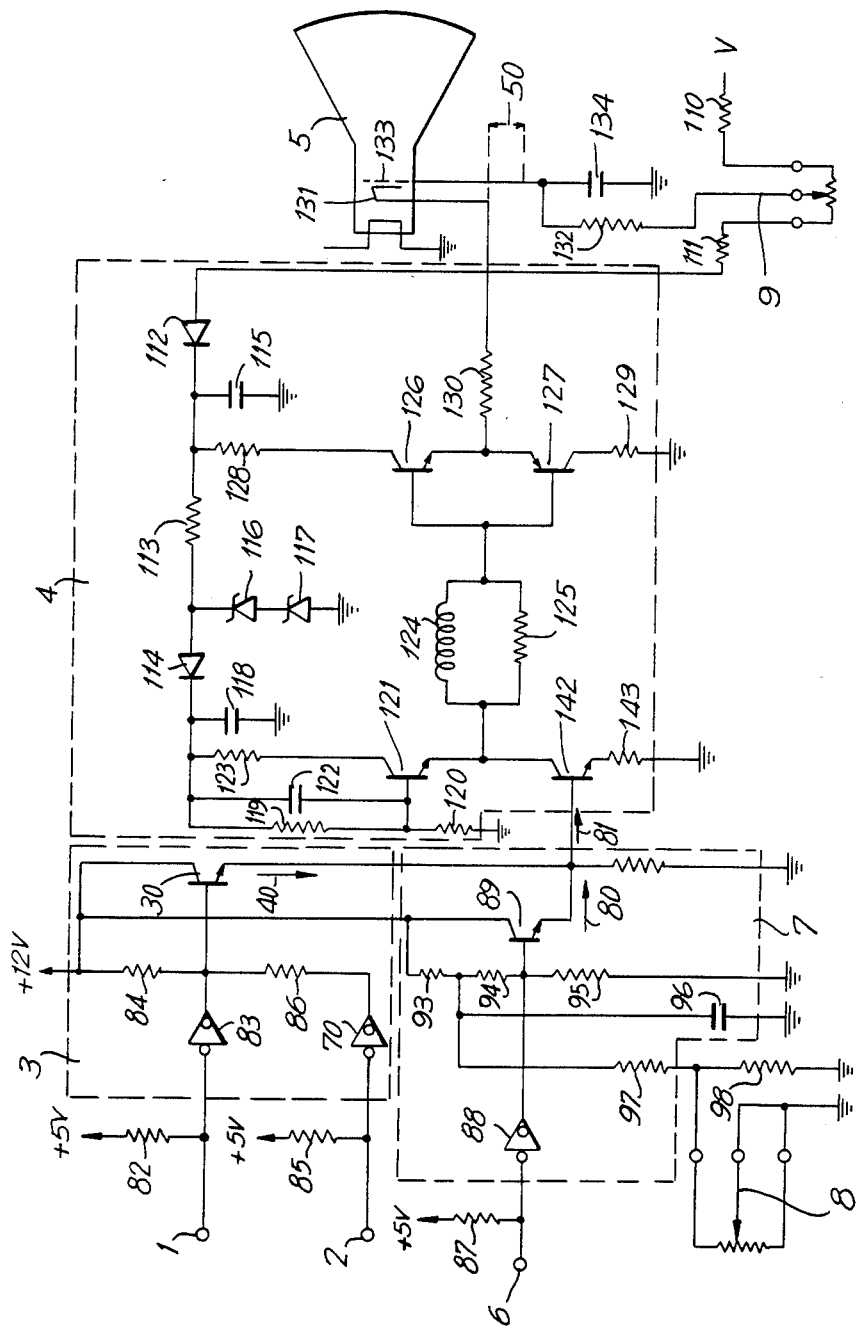
FIG. 5 is a circuit diagram of the intensity modulation circuit of FIG. 4.

Reference is next made to FIG. 5 wherein the intensity modulation circuit of FIG. 4 is depicted in greater detail. Digital video, highlight and halftone signals 1, 2 and 6 have only two levels. These digital signals are eighter in a high (H) or low (L) state.

(1) When video signal 1 is in its low state:

A transistor 30 is turned on to allow a collector current 40 to flow through main amplifier 4, thus producing as potential difference 50. The greater the potential difference 50, the brighter the display.

When video signal 1 is low and highlight signal 2 is also low the largest possible electric current 40 is present. This results in the greatest potential difference 50 and the brightest intensity level.

When video signal 1 is low and highlight signal 2 is high a current is drained to ground through an inverter 70 thereby causing the voltage at the base of transistor 30 to be lower than when highlight signal 2 is in the low state. As a result, collector current 40 is smaller than when both video signal 1 and highlight signal 2 are low.

When video signal 1 and halftone signal 6 are both low, a current 81 flowing into main amplifier 4 is the sum of current 40 and a current 80 resulting from halftone signal 6. Current 40 is much greater in magnitude than current 80 and, as a result, the sum of current 40 and current 80 can be regarded as being substantially equal to current 40.

Therefore, when video signal 1 is in the low state the state of halftone signal 6 has substantially no bearing on the brightness of the display.

(2) When video signal 1 is in its high state:

When video signal 1 is high collector current 40 is zero regardless of whether highlight signal 2 is high or low. In this situation, current 81 flowing through amplifier 4 is composed completely of current 80.

In this state, current 80 can be adjusted without varying current 40 by controlling rheostat 8 in the embodiment of FIG. 5. Thus, the brightness of only a blank area where video signal 1 is high can be adjusted by knob 8. The brightness adjustment will be described below in more detail.

When both video signal 1 and halftone signal 6 are high, current 81 is at its lowest level and as a result the least bright display is obtained.

The circuit of FIG. 5 is now more fully described. A biasing resistor 82 is connected between a power supply voltage of +5 volts and the input of a buffered inverter 83, which receives video signal 1. The output of buffered inverter 83 is connected to the base of transistor 30. A resistor 84 is connected to a +12 volt power supply at one end and to both the output of buffered inverter 83 and the base of a NPN transistor 30 at the other end. A biasing resistor 85 is connected between a +5 volt power supply and the input of buffered inverter 70 which receives highlight signal 2. A resistor 86 is connected between the output of buffered inverter 70 and a point between buffered inverter 83 and the base of transistor 30.

A biasing resistor 87 is coupled between a +5 volt power supply and the input of a buffered inverter 88 which receives halftone signal 6. The output of buffered inverter 88 is coupled to the base of a NPN transistor 89. The collector of transistor 89 is coupled to the +12 volt power supply. Biasing resistors 93, 94 are coupled in series between the +12 volt power supply and the base of transistor 89. A resistor 95 is coupled between the base of transistor 89 and ground. A capacitor 96 is connected between the junction of series resistors 93, 94 and ground. Series resistors 97, 98 are connected in series between the junction between series resistors 93, 94 and ground. Rheostat 8 is connected between ground and the junction between series resistors 97, 98.

One end of rheostat 9 is coupled through a resistor 110 to a control voltage V. The other end of rheostat 9 is coupled to the series connection of resistor 111 and diode 112. A resistor 113 is connected in series between diode 112 and a second diode 114. A capacitor 115 is connected between ground and the junction between the anode of diode 112 and resistor 113. Two zener diodes 116, 117 are connected in series between ground and the junction between resistor 113 and the anode of diode 114. A capacitor 118 is coupled between the anode of diode 114 and ground. Series resistors 119, 120 are also connected between the anode of diode 114 and ground. The base of a NPN transistor 121 is connected to the junction of resistors 119, 120. A capacitor 122 is connected between the anode of diode 114 and the base of transistor 121. A resistor 123 is connected between the output of diode 114 and the collector of transistor 121. The base of a NPN transistor 142 is connected to both the emitter of transistor 89 and the emitter of transistor 30. A resistor 143 is connected between the emitter of transistor 142 and ground. The emitter of transistor 121 and the collector of transistor 142 are connected together to one side of the parallel connection of a coil 124 and resistor 125. The other end of the parallel connection of coil 124 and resistor 125 is connected to the base of a transistor 126 and a transistor 127. A resistor 128 is connected between the anode of diode 112 and the collector of NPN transistor 126. A resistor 129 is connected between the collector of PNP transistor 127 and ground. A resistor 130 is connected between the joined emitters of transistors 126, 127 and the cathode 131 of cathode-ray tube 5.

A resistor 132 is connected between rheostat 9 and first grid 133 of said tube. A capacitor 134 is connected between ground and the junction between first grid 133 and resistor 132.

Figure 11:
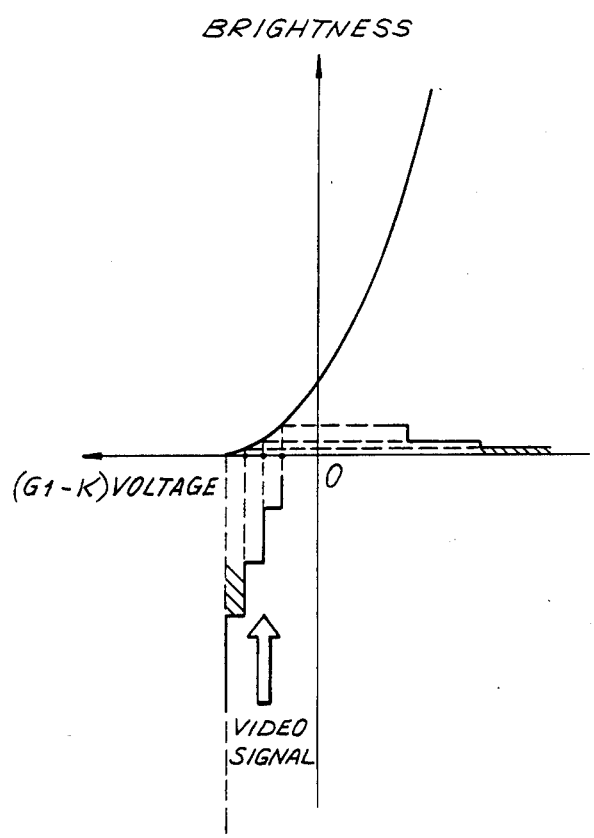
FIG. 11 is a diagram illustrating the relationship between the grid-cathode voltage and brightness in accordance with the present invention.

The relationship between intensity modulation and bias voltages in accordance with the present invention is illustrated in FIG. 11 while the corresponding relationship for the prior art is shown in FIG. 2.

The above described variations in brightness are summarized in the truth table of FIG. 6. As shown in FIG. 6, the intensity of the screen display has four distinct values. Video signals have four digital numerical values including zero volts. A special condition arises where video signal 1 is high and halftone signal 6 is low. In this state the voltage of the video signal can be varied throughout a range by the adjustment of knob 8. Accordingly, the brightness varies in a corresponding range when the cathode-ray tube system is in this state. The other digital numerical values (when the voltages are in the brightest, second and fourth brightest intensity levels) are not affected at all.

With conventional intensity modulation circuitry the brightness of limited areas of the screen cannot be separately varied because a change in the bias voltage in an effort to modulate intensity shifts the entire video signal waveform in parallel along the X axis.

However, in accordance with the present invention the brightness of only a limited area of the screen can be varied independent of other areas of the screen because the voltage of a video signal at a certain level can be changed without affecting the voltages at other areas of the screen.

Figure 7:
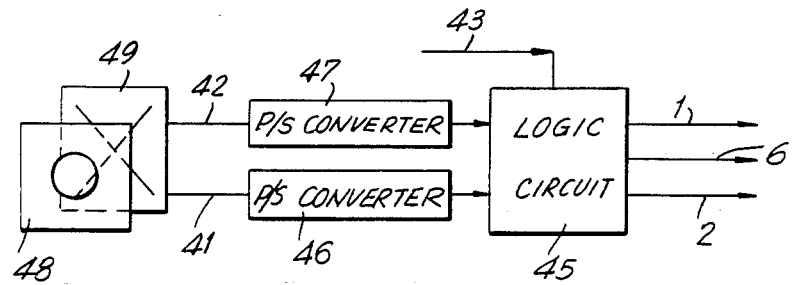
FIG. 7 is a block diagram of a mode switching circuit constructed in accordance with another embodiment of the invention.

Reference is next made to FIG. 7 wherein a circuit arrangement in block form constructed in accordance with another embodiment of the invention is depicted. Video RAMs 48, 49 apply signals 41, 42 individually through P/S converters 46, 47, repsectively, to a logic circuit 45. A mode signal 43 is also applied to logic circuit 45. Logic circuit 45 issues a video signal 1, a highlight signal 2, and a halftone signal 6.

In accordance with this embodiment it is easy to switch between a multilayer mode in which there is a superposition of images and an intensity modulation mode. One embodiment of logic circuit 45 is illustrated in more detail in FIG. 8 and a truth table of logic circuit 45 is shown in FIG. 9.

Figure 8:
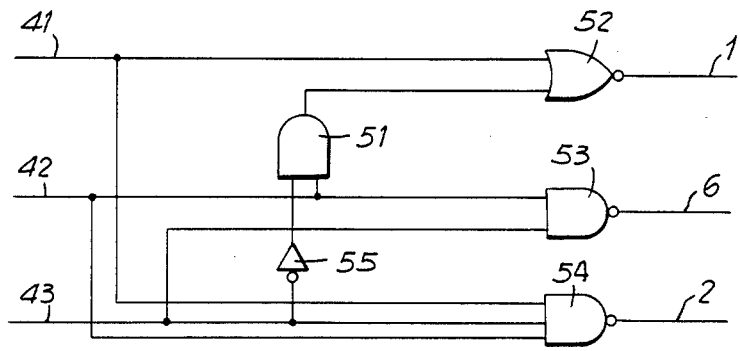
FIG. 8 is a logic diagram of a circuit in the intensity modulation circuit of FIG. 7.

Logic circuit 45, as depicted in FIG. 8 includes an AND gate 51, a NOR gate 52, NAND gates 53, 54 and an inverter 55. Digital signals 1, 2, 6 are created by logically combining signals 41, 42, 43.

Switching between the multilayer mode and the intensity modulation mode is accomplished by changing the level of mode signal 43 from its high to its low level or vice versa. More specifically, when mode signal 43 is high the truth table of FIG. 9 becomes equal to the truth table of FIG. 6 and intensity modulation can be achieved. However, when mode signal 43 is low, signals from video RAMs 48, 49 are added to achieve a multilayer mode in which a video image, as shown in FIG. 10 can be displayed.

Figure 12:
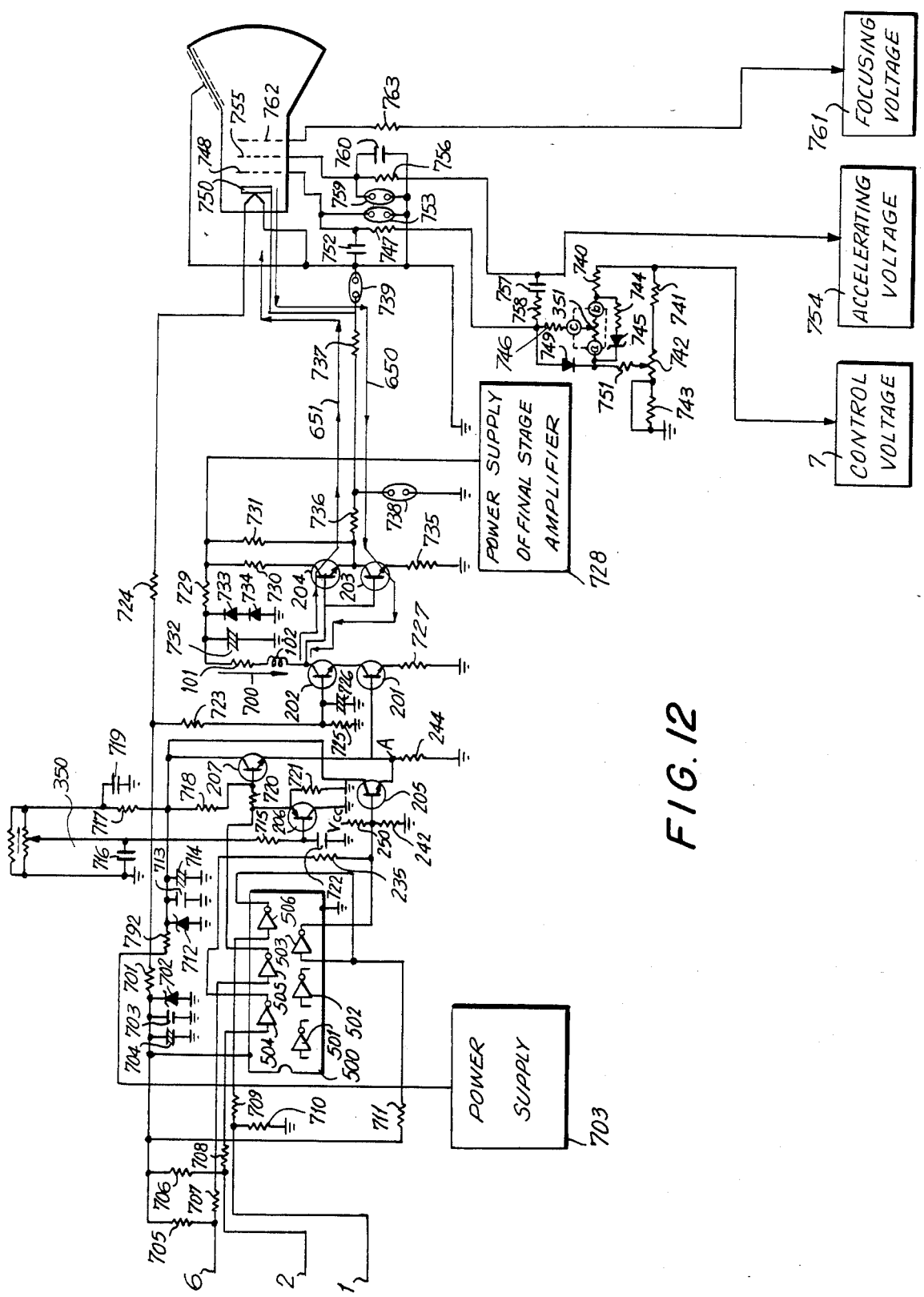
FIG. 12 is a circuit diagram of an intensity modulation circuit constructed in accordance with another embodiment of the invention.

Reference is next made to FIG. 12 wherein an intensity modulation circuit constructed in accordance with another embodiment of the invention is depicted. The intensity modulation circuit of FIG. 12 differs from the circuit of FIG. 5 in that a peaking circuit composed of a resistor 101 and a coil 102 are connected in series with a transistor 202 while maintaining the same operation and advantages of the circuit of FIG. 5.

A video signal 1 is fed through an inverter 506, an inverter 503 and a transistor 205. A highlight signal 2 flows through an inverter 504, a resistor 235 and is then applied to the base of NPN transistor 205 where it is mixed with video signal 1. A variable resistor or rheostat 351 is utilized to adjust the brightness of the overall screen.

A power supply 703 is connected to the junction of resistors 701 and 702 and to the anode of the cathode-ray tube through resistor 724. A hex inverter chip 500 has inverters 501, 502, 503, 504, 505, 506. Only inverters 503, 504, 505, 506 are utilized in the circuit. Hex inverter chip 500 is connected to both the power supply (through resistor 701) and ground. The other end of resistor 701 is connected to the junction of resistors 705 and 706. Resistor 705 is coupled to the source of halftone signal 6 and resistor 706 is coupled to the source of highlight signal 2. A zener diode 702, a capacitor 703 and a capacitor 704 are connected between ground and a point between resistor 701 and resistors 705, 706. A resistor 707 is connected between the junction of resistor 705 and the source of halftone signal 6 and the input of inverter 505. A resistor 708 is connected between the junction of resistor 706 and the source of highlight signal 2 and the input of inverter 504. Video signal 1 is connected to the input of inverter 506 through a resistor 709. A resistor 710 is connected between ground and a point between the source of video signal 1 and resistor 709. A resistor 711 is connected between resistor 701 and the input terminal of inverter 503. The output of inverter 506 is also applied as an input to inverter 503.

Power supply 703 is connected to the collector of NPN transistor 205 through resistor 702. A zener diode 712, a capacitor 713 and a capacitor 714 are connected between ground and a point between resistor 702 and the collector of transistor 205.

The base of PNP transistor 206 is connected to a rheostat 350 through a resistor 715. A capacitor 716 is connected between the junction of resistor 715 and the tap of rheostat 350 and ground. The output of rheostat 350 is connected to series resistors 717, 718. A capacitor 719 is connected between ground and the junction between resistor 717 and the output of rheostat 350. The junction between resistor 717, 718 are connected to a power supply 703 through resistor 792 and to the collector of transistor 207. A resistor 720 is connected between the base of NPN transistor 207 and the output of inverter 505. The emitter of transistor 206 is connected to ground through a resistor 721 and to the junction between resistor 720 and its output of inverter 505. A capacitor 722 is connected between the base of transistor 206 and ground.

Power supply 703 is connected through resistor 723 to the base of NPN transistor 202. A resistor 725 and a capacitor 726 are connected in parallel between ground and a point between resistor 723 and the base of transistor 202. The emitter of a NPN transistor 201 is connected to ground through a resistor 727 and the collector of transistor 201 is connected to the emitter of transistor 201. A power supply 728 is connected to the junction of resistors 729, 730, 731. Resistor 101 and inductor 102 are connected in series between resistor 729 and the collector of transistor 202. A capacitor 732 is connected between the junction of resistor 729 and resistor 101 and ground. Series zener diodes 733, 734 are also connected between the junction between resistor 729 and resistor 101 and ground. A resistor 735 is connected between the collector of PNP transistor 203 and ground. A resistor 736 is connected on one end to the connection point of resistor 731. Power supply 728 is connected through resistor 731 to the junction of the emitter of NPN transistor 204 and the emitter of PNP transistor 203, and to the series connection of resistor 736 and resistor 737. The collector of transistor 202 is connected to the joined bases of transistors 203 and 204. A spark gap 738 is connected between the junction between resistors 736 and 737 and ground. A spark gap 739 is connected between the junction of resistor 737 and cathode 750 and ground. Power supply 728 is also connected through resistor 730 to the collector of transistor 204.

A control voltage 7 for controlling the brightness of the entire screen is coupled through resistor 740 to contact b of rheostat 351. Control voltage 7 is also applied through the series connection of resistor 741, variably tapped resistor 742 and shunted resistor 743 to ground. By dynamic focusing circuit (not shown in FIG. 12), the electric potential of the focusing grid 762 is modulated dynamically to gain accurate focus in accordance with the surface curvature of CRT, and the output of the dynamic focusing circuit is given through the resistor 743 to the focusing grid 762. A resistor 744 and a zener diode 745 are coupled between contact b of rheostat 351 and contact a of rheostat 351. Contact c of rheostat 351, the variable tap, is connected to first grid 748 via series resistors 746, 747. A diode 749 is connected with its cathode coupled to the junction between resistors 746, 747 and its anode coupled to contact a of rheostat 351. A resistor 751 is coupled between contact a of rheostat 351 and the variable tap of resistor 742. A capacitor 752 is connected between the juunction between resistor 747 and first grid 748 and ground. A spark gap 753 is connected between first grid 748 and ground. Accelerating voltage 754 is connected to second grid 755 through resistor 756. Accelerating voltage 754 is connected to a point between resistors 746, 747 by the series connection of capacitor 757 and resistor 758. A spark gap 759 is connected between second grid 755 and ground. A capacitor 760 is also connected between second grid 755 and ground. A focusing voltage 761 is connected to a focusing grid 762 through a resistor 763.

Vertical and horizontal deflection circuits and a high-voltage regulation circuit, which are of known construction, are omitted from the circuit of FIG. 12. The principles of intensity modulation using highlight signal 2 in the circuit of FIG. 12 will be described in more detail with reference to FIGS. 13A and 13B.

Figure 13A:
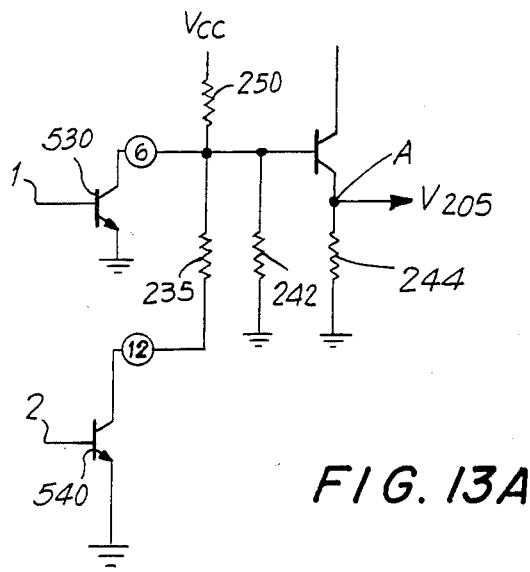
FIG. 13A is a circuit diagram of a portion of the intensity modulation circuit of FIG. 12.

In FIG. 13A a NPN transistor 530 is a final stage of inverter 503 of FIG. 12, and a NPN transistor 540 is a final stage of inverter 504 of FIG. 12. When video signal 1 is high, transistor 530 is turned on, shorting terminal 6 to ground. Accordingly, the base voltage of transistor 205 falls to zero $V_{205}$ and emitter output voltage of transistor 205 also falls to zero. Transistor 530 is turned on when video signal 1 is high. As a result, the amplifying voltage or emitter output voltage $V_{205}$ of transistor 205 becomes zero irrespective of whether highlight signal 2 is high or low, or if transistor 540 is turned on or off.

When video signal 1 is low and highlight signal 2 is high, transistor 530 is turned off and transistor 540 is turned on, current flows from the power supply through resistor 235, a resistor 242 and a resistor 244. Resistors 242 and 244 are connected between ground and the base and emitter respectively, of transistor 205. Since the voltage difference between the base and emitter of transistor 205 is small and hence can be ignored, the amplifying voltage $V_{205}$ from transistor 205 is expressed by the equation:

$$V_{205} = Vcc \cdot \frac{R_{235} // R_{242}}{R_{250} + R_{235} // R_{242}}$$

where Vcc is the power supply voltage, and $$R_{235} // R_{242} = \frac{R_{235} \cdot R_{242}}{R_{235} + R_{242}}$$

When both video signal 1 and highlight signal 2 are low transistors 530 and 540 are turned off. As a result, current flows from the power supply through resistor 242 and resistor 244. Of course, the current also flows through resistor 250. Since the voltage difference between the base and emitter of transistor 205 is negligible, the amplifying voltage $V_{205}$ from transistor 205 is substantially equal to the base voltage of transistor 205 and is expressed by:

$$V_{205} \simeq Vcc \cdot \frac{R_{242}}{R_{250} + R_{242}}$$

Figure 13B:
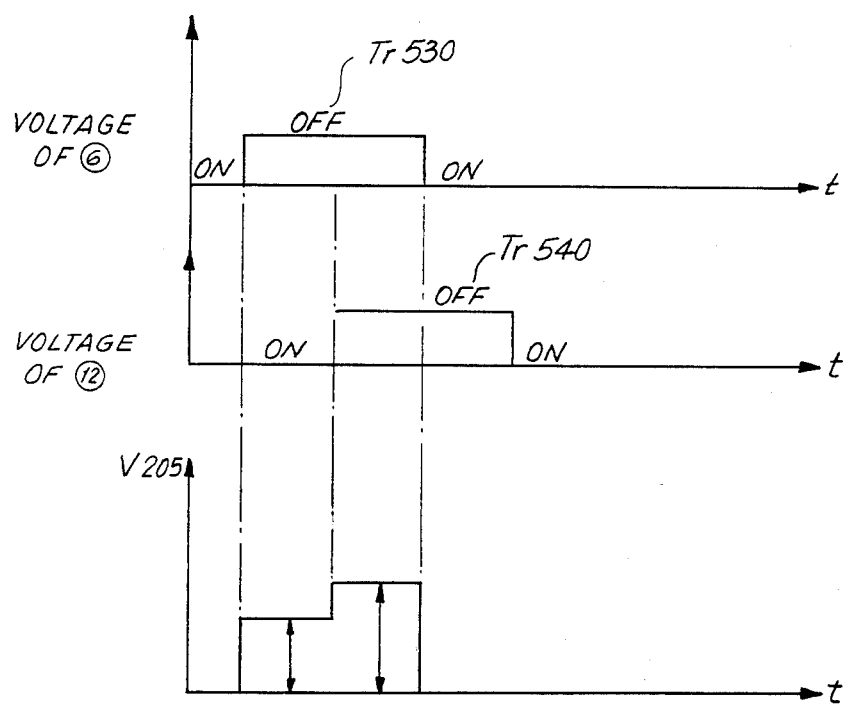
FIG. 13B is a timing chart showing the operation of the circuit of FIG. 13A.

Reference is next made to FIG. 13B wherein the operation of the circuit of FIG. 13A is depicted. FIG. 13B depicts the voltage at terminals 6 and 12 of FIG. 13A as well as the voltage $V_{205}$. As illustrated, when video signal 1 and highlight signals 2 are low, represented by transistors 530, 540 being off, amplifying voltage $V_{205}$ is highest. When video signal 1 is low and highlight signal 2 is high, represented by transistor 530 being off while transistor 540 is on, $V_{205}$ is second highest. This results in the brightness being strongest when video signal 1 and highlight signal 2 are both low and the second brightest level being when video signal 1 is low and highlight signal 2 is high.

The action of halftone signal 6 is next described. Halftone signal 6 is inverted and shaped into a waveform by inverter 505 and then applied to the base of transistor 207. Halftone signal 6 then goes through the emitter of transistor 207 and is mixed with the emitter output voltage of transistor 205. The base voltage of transistor 207 is equal to the emitter voltage of transistor 206 when the output signal from inverter 505 is high. The base voltage of transistor 206 can be varied by an external control rheostat 350, that is by varying the emitter output voltage from transistor 206, thus varying the base voltage of transistor 207. The base voltage of transistor 207 is normally selected to be lower than the base voltage of transistor 205. When there is an input signal applied to transistor 205 or when video signal 1 is low, transistor 207 is turned off and no halftone 6 appears.

When video signal 1 is low, thereby turning off transistor 530 of FIG. 13A, transistor 205 is turned on to allow the current to flow through resistor 244, thereby increasing the voltage at point A (FIGS. 12, 13A). Then, the voltage at point A becomes higher than the base voltage of transistor 207 and the output current from transistor 207 falls to substantially zero. As a result, whether halftone signal 6 is low or high has no influence on the operation of the circuit when video signal 1 is low. Halftone signal 6 only influences the brightness of the display when video signal 1 is high.

The amplification circuitry is next described. When a transistor 201 is turned on by the emitter output voltage from transistor 205 or transistor 207, a current tends to flow in the direction of arrow 700 through transistor 202. However, the flow of current is at first prevented by coil 102. Accordingly, charges are quickly drawn from cathode 750 of the cathode-ray tube along a path indicated by an arrow 650 (FIG. 12). The voltage of cathode 750 drops and an electron beam is, as a result, emitted.

When transistor 201 is then turned off, the current in path 700 ceases to flow but coil 102 tends to continuously supply the current. This is a result of the inductance of coil 102 which prevents an immediate change in current. As a result, current rapidly flows through a transistor 204 to cathode 750 along a path indicated by arrow 651. Cathode 750 is then charged to a higher voltage until there is no voltage difference between cathode 750 and ground, whereupon no electron beam is emitted.

As a result, coil 102 serves to increase the gain of the amplifier in a fundamental video frequency range.

Next, the manner of designating the area of the screen in which intensity modulation is desired is described. Various ways of achieving area designation are possible, but software-implemented control will be described here.

Software implemented control is effected by using video RAMs 48, 49 (FIG. 7) associated with the display screen. Each of video RAMs 48, 49 produces a bit signal corresponding to each single spot on the cathode-ray tube screen. Thus, there are two digital bits signals associated with each spot on the screen. High and low levels of the respective two bits result in four different grades of brightness which correspond to the four rows of the chart in FIG. 9. When both signals 41, 42 from video RAMs 48, 49 are high, video and highlight signals 1, 2 are forced low by the logic circuit illustrated in FIG. 8. This results in the brightest grade and is shown in FIGS. 6, 9.

Partial intensity modulation is possible with the third brightest grade, that is, when video signal 1 is high and halftone signal 6 is low. This condition is realized when signals 41, 42 from video RAMs 48, 49 are low and high, respectively. Therefore, partial intensity modulation is rendered possible in the area in which video RAMs 48 bit is low and video RAMs 49 bit is high.

A cathod-ray tube display constructed in accordance with the invention allows intensity modulation in a selected area on the screen of the cathode-ray tube with a simple circuit without affecting the display of other areas on the screen. This makes possible the production of a wide variety of video images.

Figures 14A, 14B, 14C:
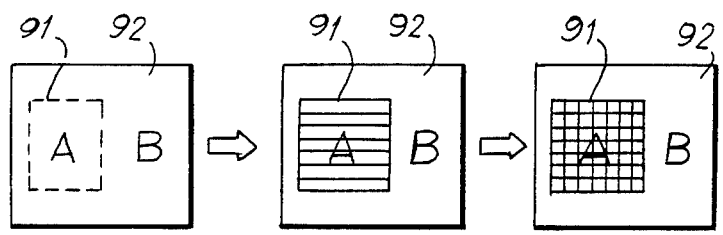
FIGS. 14A, 14B, 14C are three diagrams showing one way in which the brightness of an area on the screen is varied.

More specifically, the intensity modulation of limited areas of the screen is illustrated in FIGS. 14A, 14B, 14C. In FIG. 14A an area 91, enclosed by a dotted line, and the remaining display area 92, are at the fourth brightness grade which is the darkest of the four grades. By turning the intensity modulation knob the screen changes from the display of FIG. 14A to the display of FIG. 14B to the display of FIG. 14C. Area 91 in FIG. 14C is at the strongest brightness in the third brightness grade whereas area 92 remains at the fourth brightness grade. Therefore, when it is desired to make a particular screen area conspicuous it is possible to achieve this result by using an intensity modulation circuit constructed in accordance with the invention.

Figures 15A, 15B, 15C:
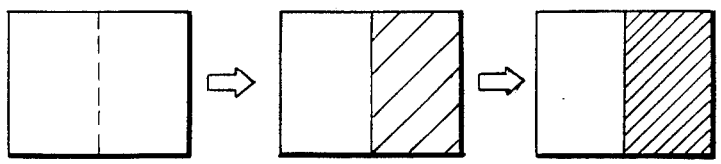
FIGS. 15A, 15B, 15C are three diagrams showing another way in which the brightness of an area on the screen is varied.

Reference is next made to FIGS. 15A, 15B, 15C wherein a different manner of highlighting a portion of the screen is depicted. The screen can also be divided into several areas of different brightnesses as shown in FIGS. 15A, 15B, 15C. In FIG. 15A the entire screen is at the fourth brightness grade. However, in FIGS. 15B and 15C the righthand portion of the screen is brightened successively so that in FIG. 15C the left half of the screen is at the fourth brightness grade whereas the right half of the screen is at the third brightness grade.

In summary, the arrangement in accordance with the invention permits two grades of intensity for data or images and two grades of intensity for background or blank areas, one of which can be varied through a range. Through data in the video RAMs one or more areas of the cathode-ray tube display can be selected for intensity variation of the background essentially independent of the intensity in non-specified areas.

It will thus be seen that the objects set forth above, among those made apparent from the preceding description, are efficiently attained and, since certain changes may be made on the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An intensity modulation circuit for a cathode-ray display device comprising:
   (a) designation means for producing digital signals representative of at least two areas of the display of said cathode-ray tube;
   (b) analog signal producing means for producing from said digital signals analog video signals having at least two brightness grades one of said grades being associated with each of said areas of the display;
   (c) intensity modulation means coupled to said analog signal producing means for varying the amplification of the analog video signal in at least one but not all of said grades;
   (d) output amplification means for receiving said analog video signals and for driving said cathode-ray tube in response thereto and switching means for switching said display device from an intensity modulation mode to an image superposition mode, said switching means coupled to said designation means.

2. The intensity modulation circuit of claim 1, wherein said analog signal producing means produces from said digital signals, analog video signals having at least three brightness grades, said intensity modulation means varying the amplification of the analog video signal in one of said at least three grades, whereby designated areas of said cathode-ray tube may be driven at at least three brightness grades, the intensity of one of said brightness grades being variable in a range, said variation of the intensity of the one grade being substantially independent of the intensity of the other brightness grades.

3. The intensity modulation circuit of claim 1, wherein said analog signal producing means produces from said digital signals, analog signals having at least four brightness grades, said intensity modulation means varying the amplification of the analog video signal in one of said at least four grades, whereby designated areas of said cathode-ray tube may be driven at at least four brightness grades, the intensity of at least one of said brightness grades being variable in a range, said variation of the intensity of the one grade being substantially independent of the intensity of the other brightness grades.

4. The intensity modulation circuit of claim 1, wherein the designation means produces three digital signals.

5. The intensity modulation circuit of claim 4, wherein the three digital signals are video, highlight and halftone signals.

6. The intensity modulation circuit of claim 1, wherein the analog signal producing means comprises:
   first amplifying means for producing an analog signal corresponding to at least one brightness grade;
   second amplifying means for producing an analog video signal corresponding to at least one other brightness grade; and
   summing means for summing the analog video signals from said first and second amplifying means.

7. The intensity modulation circuit of claim 5, wherein the analog signal producing means comprises:
   first amplifying means for producing an analog signal corresponding to at least one brightness grade;
   second amplifying means for producing an analog video signal corresponding to at least one other brightness grade; and
   summing means for summing the analog video signals from said first and second amplifying means.

8. The intensity modulation circuit of claim 7, wherein the first amplifying means produces analog video signals corresponding to two brightness grades and the second amplifying means produces analog video signals corresponding to two additional brightness grades.

9. The intensity modulation circuit of claim 8, wherein the first amplifying means is coupled to the digital video and highlight signals and the second amplifying means is coupled to the digital halftone signal.

10. The intensity modulation circuit of claim 9, wherein the brightness grade produced when the digital video signal is high and the digital halftone signal is low is the brightness grade variable in a range.

11. The intensity modulation circuit of claim 10, wherein the analog video signal produced by said first amplifying means is of substantially greater value than the analog video signal produced by said second amplifier means.

12. The intensity modulation circuit of claim 1, wherein the output amplification means comprises an amplifier.

13. The intensity modulation circuit of claim 12, wherein the amplifier includes a power supply path including a series connected resistor and inductor for increasing the gain of the amplifier in the video frequency range.

14. The intensity modulation circuit of claim 1, wherein the output amplification means comprises a variable amplifier, whereby the intensity of the entire cathode-ray tube may be varied as a unit.

15. The intensity modulation circuit of claim 1, wherein the designation means comprises first and second storage means, said first and second storage means each having at least one bit of information corresponding to each spot of the display of said cathode-ray tube.

16. The intensity modulation circuit of claim 15, wherein said first and second storage means are first and second video RAMs.

17. The intensity modulation circuit of claim 16, wherein each of said first and second video RAMs has one bit of information corresponding to each spot on the cathode-ray tube display.

18. The intensity modulation circuit of claim 1, wherein said switching means has three digital outputs.

19. The intensity modulation circuit of claim 18, wherein said three digital outputs of said switching means in said intensity modulation mode are digital video, highlight and halftone signals.

* * * * *